US010651938B2

(12) United States Patent
Xu et al.

(10) Patent No.: US 10,651,938 B2
(45) Date of Patent: *May 12, 2020

(54) BROADBAND OPTICAL NETWORK APPARATUS AND METHOD

(71) Applicant: Time Warner Cable Enterprises LLC, St. Louis, MO (US)

(72) Inventors: Jun Xu, Encinitas, CA (US); Nanjian Qian, San Diego, CA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,046

(22) Filed: Dec. 3, 2018

(65) Prior Publication Data

US 2019/0181953 A1 Jun. 13, 2019

Related U.S. Application Data

(60) Division of application No. 15/688,767, filed on Aug. 28, 2017, now Pat. No. 10,148,358, which is a
(Continued)

(51) Int. Cl.
*H04B 10/2575* (2013.01)
*H04B 10/272* (2013.01)
(Continued)

(52) U.S. Cl.
CPC ............... *H04B 10/27* (2013.01); *H04J 3/14* (2013.01); *H04J 3/1694* (2013.01);
(Continued)

(58) Field of Classification Search
CPC .................. H04B 10/25751; H04B 10/272
See application file for complete search history.

(56) References Cited

U.S. PATENT DOCUMENTS 5,189,671 A 2/1993 Cheng
5,341,365 A 8/1994 Clarke
(Continued)

OTHER PUBLICATIONS

Desai, et al., An Optical Implementation of a Packet-Based (Ethernet) MAC in a WDM Passive Optical Network Overlay, in OFC '01 Tech Dig., paper WN5, Anaheim, CA, Mar. 2001.
(Continued)

*Primary Examiner* — Shi K Li
(74) *Attorney, Agent, or Firm* — Gazdzinski & Associates, PC

(57) ABSTRACT

Methods and apparatus for providing enhanced optical networking service and performance which are particularly advantageous in terms of low cost and use of existing infrastructure, access control techniques, and components. In the exemplary embodiment, current widespread deployment and associated low cost of Ethernet-based systems are leveraged through use of an Ethernet CSMA/CD MAC in the optical domain on a passive optical network (PON) system. Additionally, local networking services are optionally provided to the network units on the PON since each local receiver can receive signals from all other users. An improved symmetric coupler arrangement provides the foregoing functionality at low cost. The improved system architecture also allows for fiber failure protection which is readily implemented at low cost and with minimal modification.

19 Claims, 13 Drawing Sheets

Related U.S. Application Data continuation of application No. 14/457,914, filed on Aug. 12, 2014, now Pat. No. 9,749,052, which is a continuation of application No. 12/456,984, filed on Jun. 24, 2009, now Pat. No. 8,842,989, which is a division of application No. 11/707,812, filed on Feb. 15, 2007, now Pat. No. 8,861,958, which is a continuation of application No. 10/120,960, filed on Apr. 9, 2002, now Pat. No. 7,181,142.

(51) Int. Cl.
*H04B 10/27* (2013.01)
*H04J 3/14* (2006.01)
*H04J 3/16* (2006.01)
*H04Q 11/00* (2006.01)
*H04J 14/08* (2006.01)

(52) U.S. Cl.
CPC ........ *H04J 14/086* (2013.01); *H04Q 11/0067* (2013.01); *H04Q 11/0066* (2013.01); *H04Q 2011/0015* (2013.01); *H04Q 2011/0064* (2013.01)

(56) References Cited

U.S. PATENT DOCUMENTS

| | | | |
|---|---|---|---|
| 5,446,809 A * | 8/1995 | Fritz | G02B 6/2932 385/17 |
| 5,453,988 A | 9/1995 | Clarke | |
| 5,548,432 A | 8/1996 | Clarke et al. | |
| 5,574,584 A | 11/1996 | Darcie et al. | |
| 5,694,234 A | 12/1997 | Darcie et al. | |
| 5,809,187 A | 9/1998 | Peck, Jr. et al. | |
| 5,864,413 A | 1/1999 | Feldman et al. | |
| 5,930,018 A | 7/1999 | Effenberger | |
| 6,043,915 A | 3/2000 | Giles et al. | |
| 6,108,713 A | 8/2000 | Sambamurthy et al. | |
| 6,144,471 A | 11/2000 | Eyberg et al. | |
| 6,304,350 B1 | 10/2001 | Doerr et al. | |
| 6,327,400 B1 | 12/2001 | Harstead et al. | |
| 6,493,335 B1 | 12/2002 | Darcie et al. | |
| 6,563,613 B1 | 5/2003 | Tochio | |
| 6,577,414 B1 * | 6/2003 | Feldman | H04J 14/0226 398/43 |
| 6,597,479 B1 | 7/2003 | Chu et al. | |
| 6,654,563 B1 | 11/2003 | Darcie et al. | |
| 6,665,498 B1 | 12/2003 | Jiang et al. | |
| 6,681,083 B1 | 1/2004 | Koonen | |
| 6,684,031 B1 | 1/2004 | Kogelnik et al. | |
| 6,771,908 B2 | 8/2004 | Eijk et al. | |
| 7,088,921 B1 | 8/2006 | Wood | |
| 7,151,782 B1 | 12/2006 | Oz et al. | |
| 7,181,142 B1 | 2/2007 | Xu et al. | |
| 7,218,854 B1 | 5/2007 | Unitt et al. | |
| 7,283,554 B2 | 10/2007 | Ophir et al. | |
| 7,602,820 B2 | 10/2009 | Helms et al. | |
| 8,693,866 B1 | 4/2014 | Lam et al. | |
| 8,712,241 B2 * | 4/2014 | Xu | H04J 3/14 398/67 |
| 8,713,623 B2 | 4/2014 | Brooks | |
| 8,842,989 B2 * | 9/2014 | Xu | H04J 3/14 398/67 |
| 9,749,052 B2 * | 8/2017 | Xu | H04J 3/14 |
| 2002/0030865 A1 | 3/2002 | Kawate et al. | |
| 2002/0031224 A1 | 3/2002 | Basawapatna et al. | |
| 2002/0041728 A1 | 4/2002 | Yamashita et al. | |
| 2002/0063924 A1 | 5/2002 | Kimbrough et al. | |
| 2002/0121937 A1 | 9/2002 | Marutani et al. | |
| 2002/0184644 A1 * | 12/2002 | Lund | H04N 7/162 725/107 |
| 2003/0063847 A1 | 4/2003 | Buabbud | |
| 2003/0177215 A1 | 9/2003 | Sutherland et al. | |
| 2004/0240466 A1 | 12/2004 | Unitt et al. | |
| 2006/0053462 A1 | 3/2006 | Albag et al. | |
| 2007/0274717 A1 | 11/2007 | Xu et al. | |
| 2007/0297716 A1 | 12/2007 | Helkey et al. | |
| 2008/0040430 A1 | 2/2008 | Shivaji-Rao | |
| 2008/0273877 A1 | 11/2008 | Palacharla et al. | |
| 2009/0232500 A1 | 9/2009 | Villarruel et al. | |
| 2009/0249421 A1 | 10/2009 | Liu et al. | |
| 2010/0098407 A1 | 4/2010 | Goswami et al. | |
| 2011/0035772 A1 | 2/2011 | Ramsdell et al. | |
| 2011/0292785 A1 | 12/2011 | Hardin | |
| 2012/0321315 A1 | 12/2012 | Timm et al. | |
| 2013/0148979 A1 | 6/2013 | Hsiao | |
| 2013/0177314 A1 | 7/2013 | Mizuguchi et al. | |
| 2014/0223504 A1 | 8/2014 | Ling et al. | |
| 2014/0229604 A1 | 8/2014 | Pfeffer | |
| 2015/0050016 A1 | 2/2015 | Takita et al. | |
| 2015/0110489 A1 | 4/2015 | Brooks | |
| 2015/0249520 A1 | 9/2015 | Badar et al. | |

OTHER PUBLICATIONS

Chae, et al., "A New ATM PON System Suitable for Local Access and Local Private Networking Services", in OFC '01 Tech. Deg., paper WU4, Anaheim, CA, Mar. 2001.

Chae, et al., "A PON System Suitable for Internetworking Optical Network Units Using a Fiber Bragg Grating on the Feeder Fiber", IEEE Photon. Technol. Lett., vol. 11, No. 12, pp. 1686-1688, Dec. 1999.

ITU-T, "Broadband Optical Access Systems Based on Passive Optical Networks (PON)", ITU-T Recommendation G.983.1, Oct. 1998.

Kramer, et al., "Ethernet Passive Optical Network (EPON): Building a Next-Generation Optical Access Network", IEEE Commun. Mag., vol. 40, No. 2, pp. 66-73, Feb. 2002.

Phillips, et al., "Redundancy Strategies for a High Splitting Optically Amplified Passive Optical Network", J. Lightwave Technol., vol. 19, No. 2, pp. 137-149, Feb. 2001.

Schwartz, "Telecommunication Networks", 1987, pp. 441-447.

Tanenbaum, "Computer Networks", Prentice-Hall, 1981, pp. 292-295.

* cited by examiner

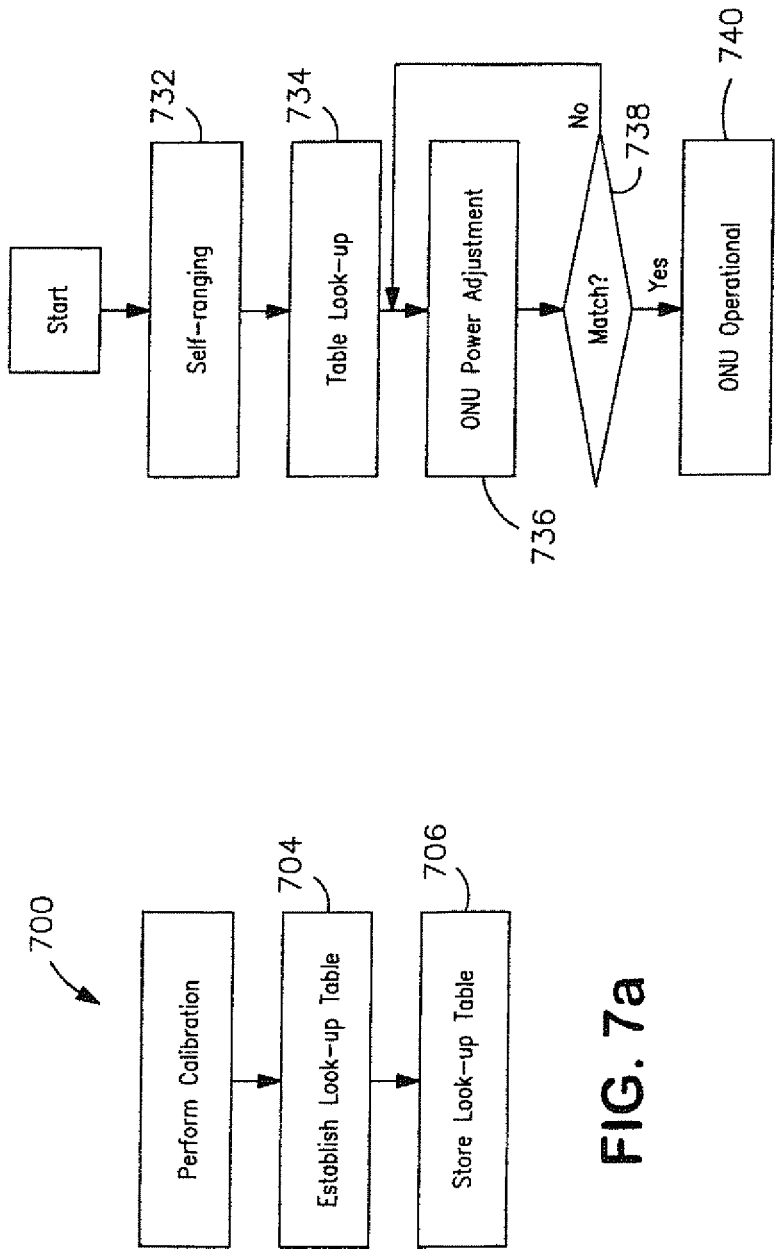

BROADBAND OPTICAL NETWORK APPARATUS AND METHOD

PRIORITY

This application is a divisional of and claims the benefit of priority to co-owned U.S. patent application Ser. No. 15/688,767 of the same title filed Aug. 28, 2017 and issuing as U.S. Pat. No. 10,148,358 on Dec. 4, 2018, which is a continuation of and claims the benefit of priority to co-owned U.S. patent application Ser. No. 14/457,914 of the same title filed Aug. 12, 2014 and issued as U.S. Pat. No. 9,749,052 on Aug. 29, 2017, which is a continuation of and claims the benefit of priority to co-owned Ser. No. 12/456,984 of the same title filed Jun. 24, 2009 and issued as U.S. Pat. No. 8,842,989 on Sep. 23, 2014, which is a divisional of and claims the benefit of priority to co-owned U.S. patent application Ser. No. 11/707,812 of the same title filed Feb. 15, 2007 and issued as U.S. Pat. No. 8,861,958 on Oct. 14, 2014, which is a continuation of and claims the benefit of priority to co-owned U.S. patent application Ser. No. 10/120,960 of the same title filed Apr. 9, 2002 and issued as U.S. Pat. No. 7,181,142 on Feb. 20, 2007, each of the foregoing being incorporated herein by reference in its entirety.

BACKGROUND OF THE INVENTION

1. Field of the Invention

The invention relates generally to an optical network system, including for example a broadband passive optical network (B-PON). In particular, the invention describes an optical network system that allows alternative access techniques (such as for example an Ethernet-type CSMA/CD MAC) to be implemented optically on the network.

2. Description of Related Technology

While optical networking as an industry has experienced significant growth over the past few years, this growth is mainly focused on long haul or backbone optical networks. Although new technologies that allow cost-effective, scalable, reliable, high-bandwidth services are emerging in the metro and regional market, little has changed in the access arena. The ever-increasing demand for bandwidth has accelerated the lag of subscriber access network capacity. In other words, the bandwidth bottleneck has evolved outward from the core to the subscriber access network, or the so-called "first mile." In order to be able to provide the new services that customers demand, service providers need to find ways to offer higher data rates at reasonable costs.

Several technologies exist today that are being used to increase the capacity of subscriber access networks. For example, hybrid fiber-coaxial (HFC) and digital subscriber line (DSL) networks are being deployed by many service providers. The HFC architecture utilizes optical fiber to transport data from the head-end to a curbside optical node in the neighborhood. The final distribution to the subscriber homes is performed by coaxial cable using a bus architecture. While this is a relatively low cost evolution of widely deployed CATV fiber-node architecture, it suffers from very low throughput during peak hours due to the large number of subscribers who share the bandwidth provided by the optical node. DSL uses the same twisted pair as telephone lines and requires a DSL modem at the customer premises and a digital subscriber line access multiplexer (DSLAM) in the central office. While the data rate (128 Kb/s-1.5 Mb/s) offered by DSL is significantly higher than that of an analog modem, it can hardly be considered as broadband as it cannot support full-service voice, data, and video. In addition, it suffers the distance limitation as one central office can only cover distances less than approximately 5.5 km using present technologies.

In the past several years, two technologies have begun to emerge as alternatives for optical access: (i) point-to-point Gigabit Ethernet, and (ii) passive optical network (PON). Point-to-point is the topology Ethernet has used successfully for a decade. It is a logical way to deploy optical fiber in the subscriber access network. However, with dedicated fiber running from the central office to each subscriber, this architecture has very low fiber utilization (N fibers and 2N transceivers are needed for N subscribers). While the technology has its merits, such as very easy bandwidth provisioning and its excellence for native LAN extension service, in many cases, it is viewed by many as a less attractive solution for small- to medium-sized businesses and residences. An alternative to the point-to-point Ethernet is the curb-switched Ethernet where a remote switch is deployed near the neighborhood. While this reduces the fiber consumption from N fibers to 1 fiber, the number of transceivers increases by 2 to 2N+2. In addition, a curb-switched Ethernet requires active components and therefore electrical power in the field, an unfavorable situation due to, inter alia, high cost.

Passive optical networks (PONs) are low cost Fiber-to-the-Building/Curb/Home (FTTb, FTTc, FTTh, collectively referred to as FTTx) solutions. A PON is a point-to-multipoint optical network that allows service providers to minimize the need for fiber in the outside portion of the network to interconnect buildings or homes. The basic principle of PON is to share the central optical line terminal (OLT) and the feeder-fiber by as many optical network units (ONUs) as is practical. This resource sharing allows a significant reduction of network capital expense allocated to each subscriber and therefore enables broadband fiber access in areas where achieving profitability has been a formidable task for traditional point-to-point or ring-based architectures.

A typical prior art PON model 100 is shown in FIG. 1, and consists of four elements: an optical line terminal (OLT) 102, a plurality of optical network units (ONUs) 104, an optical distribution network, also know as the outside plant (OSP) 106, and an element management system (EMS) 108. The OLT 102 typically resides in the central office (CO), serving as the interface between the PON system and the service provider's core networks 110. The ONUs 104 are located at either the curb or the end-user location, serving as the interface between the PON system 100 and broadband service customers 112. The optical distribution network 106 includes single-mode fiber optic cable, passive optical splitters/couplers, connectors and splices. The element management system (EMS) 108 manages a plurality of PONs and there respective nodes. It offers network management functions in areas including fault detection/isolation, configuration, accounting, performance, and security. The OLT and ONUs are now described in more detail.

The OLT 102 in a typical asynchronous transfer mode (ATM) PON system consists of three parts: (i) the service port function; (ii) an ODN interface; and (iii) a MUX for VP grooming.

The service port function serves as an interface to service nodes. The service port function inserts ATM cells into the upstream SONET/SDH payload and extracts ATM cells from the SONET/SDH payload.

The optical distribution network interface performs optoelectronic conversion. It inserts ATM cells into the downstream PON payload and extracts ATM cells from the upstream PON payload.

Lastly, the MUX provides VP connections between the service port function and the ODN interface.

An ONU in an ATM PON system consists of an ODN interface, user port, transmission, customers and services, mux/demux functions, and powering. The ODN interface performs the optoelectronic conversion. The ODN interface extracts ATM cells from the downstream payload and inserts ATM cells into the upstream PON payload. The MUX multiplexes service interfaces to the ODN interface(s). The user port interfaces over UNI to a terminal, and inserts ATM cells into the upstream payload and extracts ATM cells from the downstream payload. ONU powering is typically implementation dependent.

The wavelength window of PON is typically in the 1.5 µm region for downstream and 1.3 µm region for upstream to support a single fiber system. Downstream traffic is transmitted from the central office towards the optical star coupler where light signal is passively split and distributed by a plurality of optical fibers to a plurality of optical network units (ONUs). The ONUs provide data, voice, and video services to the end subscriber(s) electronically. In the upstream direction, the respective signals from the ONUs are passively combined by the optical star coupler. The combined optical signal is then distributed to the central office through a single optical fiber. Some proposed PON schemes utilize wavelengths other than 1.5 µm/1.3 µm or multiplex additional wavelengths to support an analog/digital video overlay on the same fiber. Others use a second PON (video PON) to provide video services. The video PON is typically provided on a parallel fiber that has the same physical layout as the first PON.

To date, PON-based optical access networks have primarily been designed to use asynchronous transfer mode (ATM) as its layer 2 protocol (ITU Std. G.983), and thus the term "APON." ATM was chosen because it was considered to be suitable for multiple protocols. In this scheme, both downstream and upstream data are formatted to fit into the fixed time slot cell structure (e.g., 53 bytes) of ATM. In the downstream direction, data is broadcast at 1550 nm using Time Division Multiplexing (TDM) protocol for point-to-multipoint transmission. In the upstream direction, 1310 nm is used over which a Time Division Multiple Access (TDMA) protocol is applied providing the multipoint-to-point shared medium access.

More recently, however, Ethernet (IEEE Std. 802.3) has emerged as a universally accepted standard, with several hundred millions of Ethernet ports deployed worldwide. This large-scale deployment has steadily driven the prices of standard Ethernet devices down. As of this writing, the deployment of Gigabit Ethernet is increasing and 10 Gigabit Ethernet products are becoming more and more available. In addition to its economic advantages, Ethernet is in many ways a logical candidate for an IP data optimized access network. An Ethernet PON (EPON) is a PON in which both downstream and upstream data are encapsulated in Ethernet frames. For the most part, an EPON is very similar to an APON (see FIG. 1) in that the network topology is architecturally similar and adheres to many G.983 recommendations. In the downstream direction, Ethernet frames are broadcast at 1550 nm through the 1:N passive star coupler and reach each ONU. Since broadcasting is one of the key characteristics of Ethernet, it makes logical sense to use Ethernet frames in the PON architecture. In the upstream direction, traffic is managed utilizing time-division multiple access (TDMA). In this scheme, transmission time slots are allocated to all of the ONUs. The time slots are synchronized so that upstream data from the ONUs do not collide with each other once the data are coupled onto the single common fiber. For the purposes of the present discussion, both APONs and EPONs are referred to herein as PONs.

Although the art of transmitting data from central office to user and from user to central office is well developed based on either APON or EPON technology, certain problems still exist. In particular, in the upstream direction, due to the directional properties of the optical star coupler, data from any ONU 104 will only reach the OLT 102, and not other ONUs. Thus, simultaneously transmitted data from different ONUs 104 use a time-sharing mechanism (i.e. TDMA) to avoid collision. Some other methods for avoiding upstream collisions include installing an Ethernet hub at the star coupler (and thereby effectively defeating the purpose of being passive), and using wave-division multiplexing (WDM) to separate one ONU from another. This latter approach is quite cost prohibitive. Due to the lack of their popularity, these latter two methods (i.e., use of the Ethernet hub and WDM) are not discussed further herein.

While TDMA does provide the scheduling capability, it also imposes more complexity on hardware and protocol software. For example, both OLT and ONU must be able to manage and process the transmitted and received data in terms of timeslots and frames as well as perform frame synchronization. Clearly, these requirements cannot be easily satisfied by conventional Ethernet or non-Ethernet devices. In addition, in order to avoid upstream frame collision in an APON (and presumably EPON as well), the OLT 102 must perform an operation known as "ranging" in which the OLT measures the distance to each ONU 104, and then tells the ONU 104 to insert the appropriate delay so that all equivalent OLT-ONT distances are a predetermined value, e.g., 20 km. The ranging procedure complicates the protocol software significantly.

Another common problem associated with existing passive optical networks is the so-called "near-far" problem. This problem is caused by unequal distances between the central office and various ONUs. The longer the distance, the lower the power level received at the OLT 102. A number of approaches have been considered to overcome this problem. For example, a burst mode OLT receiver that is able to quickly adjust its zero-one threshold at the beginning of each received time slot can be used to detect the incoming bit-stream correctly. Alternatively, a special OLT-ONU signaling protocol can be developed that allows the ONUs to adjust their respective transmitter power based on OLT feedback such that power levels received by the OLT from all the ONUs are the same. While these methods do solve the near-far problem, they require highly sophisticated hardware and/or software, thereby increasing complexity as well as cost of implementation.

It is noted that even in the case of EPON, as long as TDMA is used to resolve upstream frame collision, significant amount of hardware and software components are required at both the OLT 102 and ONU 104. These components are not the types used on enterprise Ethernet networks and therefore may not benefit from the volume advantage of standard Ethernet devices.

Additionally, it will be recognized that the operation of Ethernet is largely based on the contention-based media access protocol CSMA/CD along with the back-off algorithm (10 Gigabit Ethernet not included). This MAC layer protocol has many desirable characteristics such as simplicity and being a well understood and proven technology. Therefore, it is highly desirable to operate the PON using Ethernet-like MAC protocols.

Based the foregoing, it is clear that a need exists for an improved optical networking architecture and methods that take advantage of the popularity of widely accepted communications standards and protocols (such as Ethernet) and their high deployment scale. Ideally, such architecture and methods would employ a simple medium access protocol (such as the aforementioned CSMA/CD), and allow the use of low-cost network interface devices based on these widely accepted standards and protocols.

SUMMARY OF THE INVENTION

The present invention satisfies the aforementioned needs by an improved apparatus and method for optical networking.

In a first aspect of the invention, an improved networking architecture is disclosed. This improved architecture generally comprises a first node being adapted for transmitting and receiving optical signals; a first optical coupler in optical communication with the first node and adapted to split signals received by the first coupler; a second optical coupler in optical communication with the first node and adapted to split signals received by the second coupler, said second coupler also being in optical communication with the first coupler; and a plurality of second nodes in optical communication with both the first and second couplers, the plurality of nodes each being adapted for transmitting and receiving optical signals; wherein the first coupler may be used to split signals received from one of the second nodes and communicate signals to another of the nodes via the second coupler.

In one exemplary embodiment, the network apparatus comprises two interconnected passive optical networks (PONs), with each network employing a 2×N (e.g., N=16 or 32) passive star coupler. An optical line terminal (OLT) is connected to a first port of the first star coupler through a single feeder-fiber. Other ports of the first star coupler are connected to a plurality of optical network units (ONUs) through a number (N) of distribution fibers. Each of these ONUs is associated with a respective remote user or group of remote users. The connections in the second passive optical network are essentially the same. In both networks, the downstream traffic is broadcast by a transmitter at the CO to the ONUs by the first and the second star couplers, respectively. The first PON carries one or more first types of information (e.g., data, voice, and IP streaming video), while the second PON carries one or more second types of information (e.g., video). In this exemplary embodiment, the first PON is an Ethernet passive optical network (EPON) where all information (e.g., data, voice, and IP video) are encapsulated in Ethernet frames. The second PON is a video passive optical network (VPON) where standard analog video content can be delivered along with digital CATV over the RF spectrum. The first and second star couplers are interconnected by an optical fiber between corresponding ports thereof. In the upstream direction, an optical signal from an ONU (e.g., with operating wavelength 1260-1360 nm) is coupled to a port of the first star coupler. This optical signal is then redirected to a corresponding port of the second star coupler. The redirected optical signal is broadcast to the ONUs equipped with optical receivers for local communications. The detection of optical signal by another transmitting ONU indicates that a collision has occurred. Hence, the apparatus not only provides integrated data, voice, and video services but also allows all remote users to detect the upstream transmission by other users.

In the exemplary embodiment, an Ethernet CSMA/CD MAC can advantageously be implemented in the optical domain on a PON system. Additionally, local networking services can be provided to all the ONUs. Finally, by taking full advantage of the highly symmetrical structure, the system architecture can support feeder-fiber protection with minimum cost.

In a second aspect of the invention, an improved optical network unit is disclosed. The optical network unit generally comprises: a first optical network interface adapted to transfer first signals between a first user device operating in a non-optical domain and an optical network; and a second optical network interface adapted to transfer second signals between a second user device operating in a non-optical domain and the optical network. In one exemplary embodiment, the optical network comprises a PON, with the network unit designed to interface with local loop or user-end equipment. The unit converts signals into the optical domain and transmits them onto the network. The unit is also adapted to receive optical video signals and convert them into the user-end domain (e.g., coaxial distribution) for use by the user(s). The unit also includes a third interface for receiving "redirected" split optical signals from other units in the same network in order to facilitate arbitration and collision detection as previously described.

In a third aspect of the invention, an improved method for arbitrating among a plurality of network units of a broadband optical network. The method generally comprises splitting first optical signals derived from at least one of a plurality of network units using a first coupler to produce at least second and third signals; splitting at least a portion of the second signals using a second coupler; and distributing at least a portion of the split second signals to the plurality of network units. The split second signals allow the network units to implement an access protocol (such as the aforementioned CSMA/CD protocol), thereby arbitrating access to the network assets between themselves.

In a fourth aspect of the invention, an improved method for providing feeder protection in an optical network is disclosed. The method generally comprises: providing first and second optical couplers each in optical communication with (i) a first node via respective first and second fibers, and (ii) each of a plurality of second nodes; utilizing at least the first fiber to transfer optical signals between the first node and the plurality of second nodes via the first coupler during non-fault conditions; and utilizing the second fiber to transfer optical signals between the first node and the plurality of second nodes via the second coupler during fault conditions on the first fiber.

In a fifth aspect of the invention, an improved method of controlling the optical power applied by an optical source to an optical network having a plurality of optical couplers is provided. The method generally comprises: establishing an information resource (e.g., look-up table) having at least first information relating to the optical network; determining the path distance between the source and at least one of the optical couplers; accessing the information resource using said path distance to determine a desired transmitter power level; and adjusting the actual transmitter power level to the desired level if required.

In one aspect of the present disclosure, an optical network apparatus is disclosed. In one embodiment thereof, the optical network apparatus includes a first P×N optical coupler configured for use with at least one passive optical network (PON), the first P×N optical couple including: at least a first interface coupled to an optical line terminal (OLT); a plurality of second interfaces configured for communication with a plurality of optical network units (ONUs); and at least a third interface; wherein the first P×N optical coupler is further configured to provide the video data signal to at least one of the plurality of ONUs via at least one of the plurality of second interfaces.

In another aspect of the present disclosure, a computerized method of providing converged services is provided. In one embodiment, the computerized method includes providing a first type of data transfers to a first input of a first optical coupler; providing a second type of data transfers to a second input of the first optical coupler; enabling a second optical coupler to redirect the first type of data transfers from the second optical coupler to the first input of the first optical coupler; and enabling the first optical coupler to combine the first type of data transfers and the second type of data transfers into an output stream for delivery to a plurality of subscriber devices via a converged passive optical network (PON).

In another aspect of the present disclosure, an optical line terminal (OLT) communicable within an optical network is disclosed. In one embodiment, the OLT includes a first network interface configured to transmit at least Ethernet traffic to one or more client devices via a first optical apparatus; and enable the first optical apparatus to receive at least Ethernet traffic from the one or more client devices via the first optical apparatus; and a second network interface configured to enable transmission of at least video traffic and the at least received Ethernet traffic to the one or more client devices via a second optical apparatus of the optical network.

BRIEF DESCRIPTION OF THE DRAWINGS

The features, objectives, and advantages of the invention will become more apparent from the detailed description set forth below when taken in conjunction with the drawings, wherein:

FIG. 7a is a logical flow diagram illustrating one exemplary embodiment of the calibration methodology according to the present invention.

FIG. 7b is a logical flow diagram illustrating one exemplary embodiment of the power balancing methodology according to the present invention.

DETAILED DESCRIPTION

Reference is now made to the drawings wherein like numerals refer to like parts throughout.

It is noted that while the following description is cast primarily in terms of an exemplary Ethernet-based CSMA/CD system, other access techniques and protocols may be used in conjunction with or in place of the particular techniques described herein. Accordingly, the following discussion of the Ethernet CSMA/CD approach is merely exemplary of the broader concepts.

As used herein, the terms "splitting" and "split" refer generally to the process of dividing or reducing a signal into two or more constituent components, and in no way is limited to an even division into two equal components.

As used herein, the term "node" refers to any functional entity associated with a network, such as for example an OLT or ONU, whether physically discrete or distributed across multiple locations.

Overview

The present invention includes methods and apparatus for providing enhanced optical networking service and performance which are particularly advantageous in terms of low cost and use of existing infrastructure and systems.

In the exemplary embodiment, the invention leverages the current widespread deployment and associated low cost of Ethernet-based systems to provide the aforementioned benefits. Specifically, an Ethernet CSMA/CD MAC is advantageously implemented in the optical domain on a conventional PON system. Additionally, local networking services can be provided to all the network units (ONUs) on the network since each local receiver can receive signals from all other users. A novel symmetric coupler arrangement provides this functionality at low cost.

Finally, by taking full advantage of the aforementioned symmetrical structure of the system architecture, the system can support feeder-fiber protection with minimum cost. Such protection strategy greatly improves the service and access network availability and yet maintains the low-cost characteristic of the conventional PON.

Apparatus and Methods

Referring now to FIGS. 2-11, an exemplary embodiment of the present invention is described in detail. In this embodiment, a B-PON architecture is disclosed that enables a simplified (e.g., CSMA/CD) MAC to be implemented in the optical domain such that no other complicated MAC protocol is required. As a result, standard Ethernet devices can advantageously be used with only minor optical and electronic adaptation. Another significant advantage of this approach is that the existing PON architectures require very little change, and the number of extra components required is minimum. The utilization of specially adapted optical couplers (e.g., two 2×N optical star couplers in the illustrated embodiment) are instrumental in providing these features.

Figure 1:
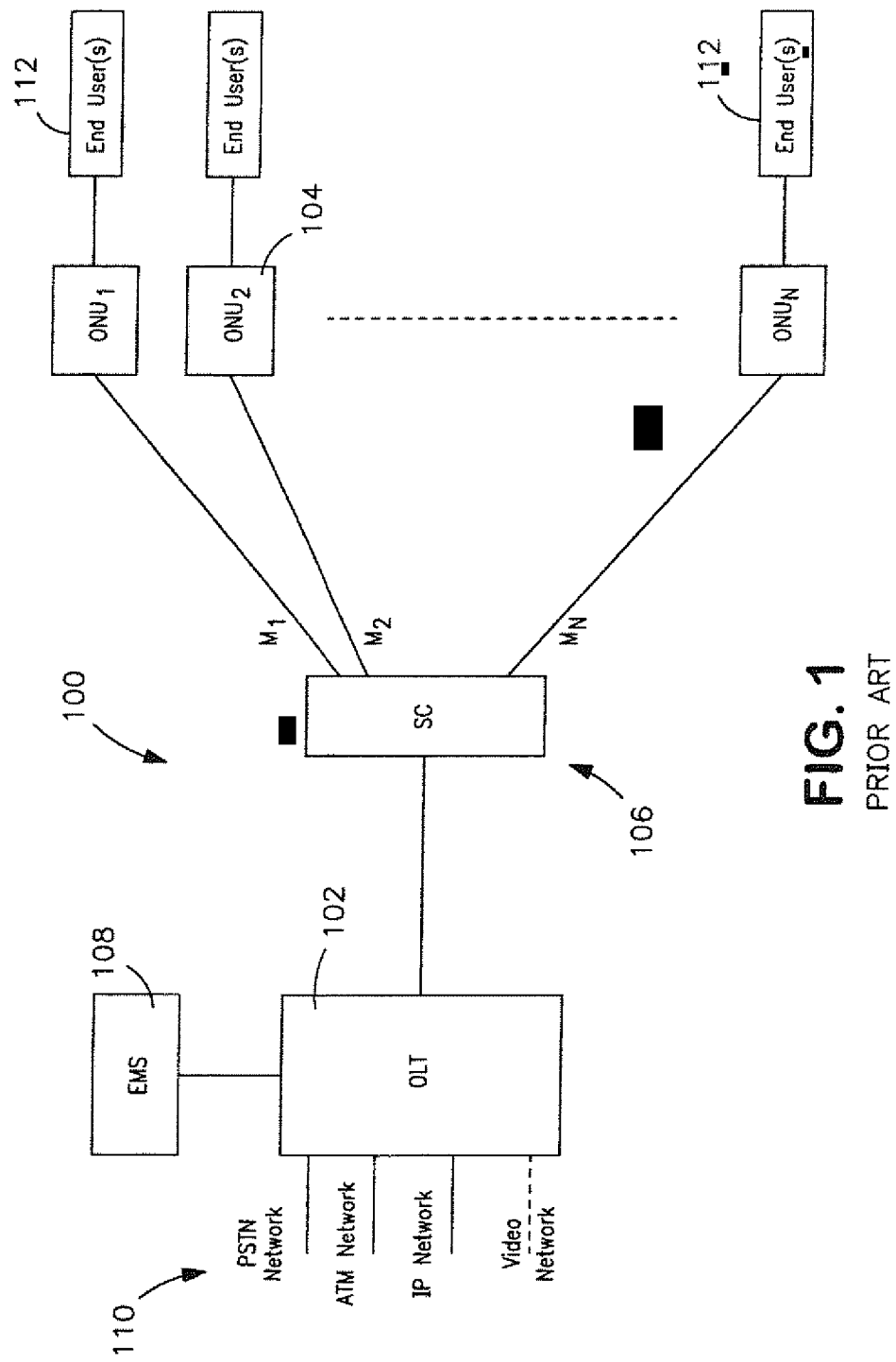
FIG. 1 is a functional block diagram of a typical passive optical network (e.g., APON or EPON) architecture according to the prior art.
Figure 2:
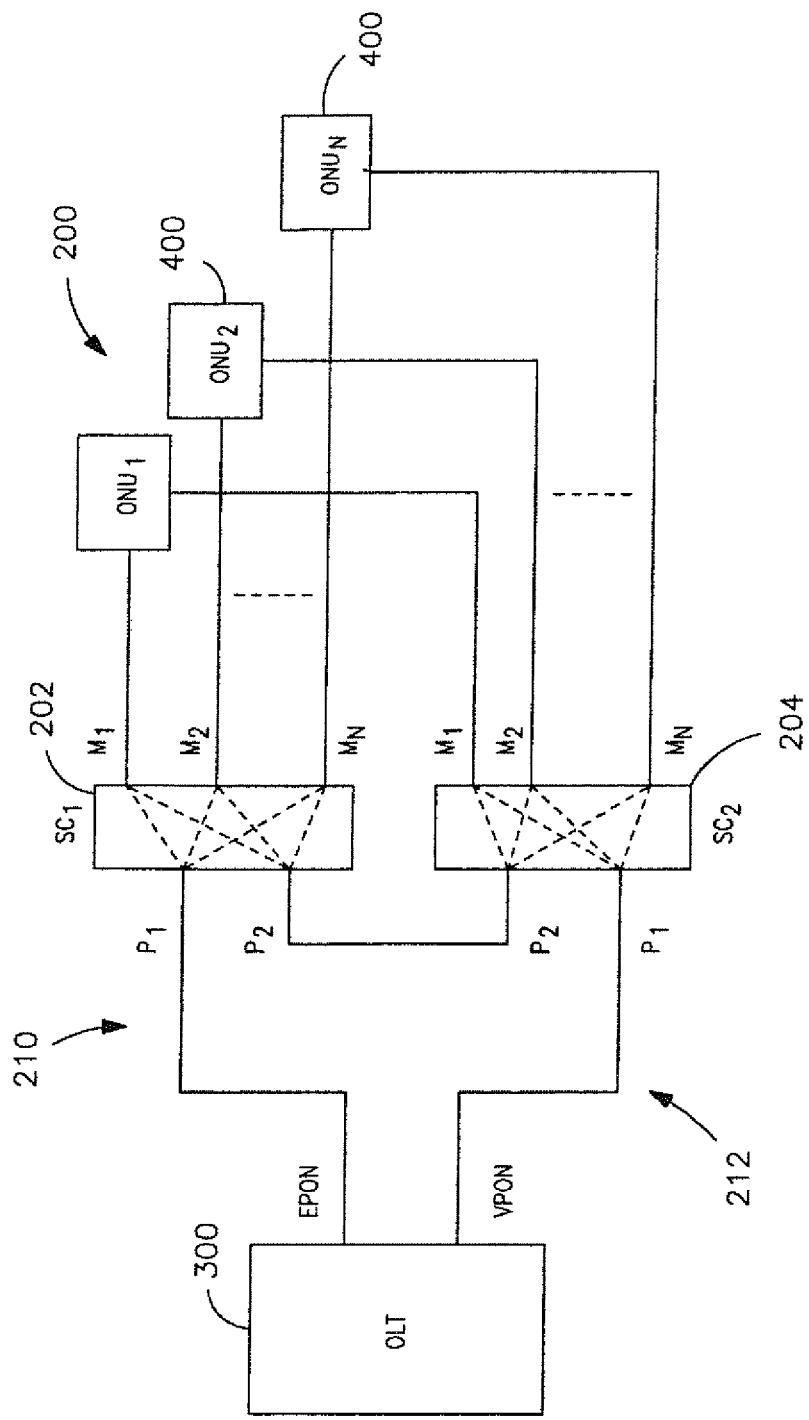
FIG. 2 is a functional block diagram of one exemplary embodiment of the optical network architecture according to the present invention.

FIG. 2 illustrates an exemplary network architecture according to the invention. For clarity, the EMS, the service provider's core networks, and the end users are not shown. In this architecture 200, two effectively parallel optical couplers 202, 204 are provided between the OLT 300 (FIG. 3) and the plurality of ONUs 400 (FIG. 4) which form the network. The respective optical couplers 202, 204 are dedicated to corresponding or symmetrical portions of the network; i.e., the "data" portion 210 and the video portion 212. In the present embodiment, the data portion 210 is based upon the Ethernet standard as previously discussed, thereby comprising an Ethernet passive optical network (EPON). By providing both data and other (e.g., video) services in one PON, the architecture 200 of FIG. 2 is considered "converged" or multi-functional.

Figure 2A:
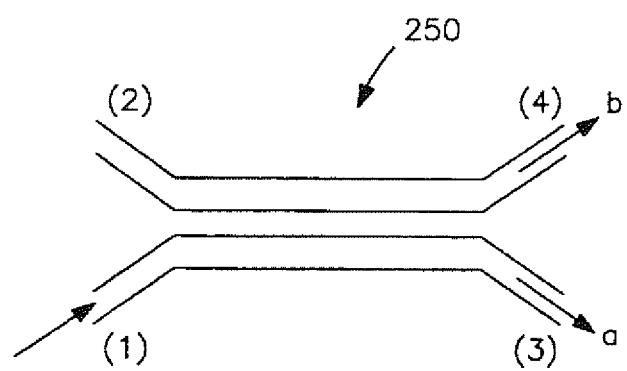
FIG. 2a is a graphical representation illustrating the operation of a 2×2 directional coupler according to the prior art.

FIG. 2a shows an exemplary embodiment of a 2×2 directional coupler 250 that can be naturally generalized to a P×N star coupler. As is well known in the optical arts, a star coupler can be used to split and combine signals in an optical network. It has the property that the power from each input is equally divided among all the outputs. The minimum theoretical insertion loss in dB of a P×N star coupler is given by Eqn. 1:

$$L_{P \times N} = 10 \log_{10}(\max\{P, N\}) \quad \text{(Eqn. 1)}$$

It is noted that optical star couplers are reciprocal devices, that is, they work exactly the same way if their inputs and outputs are reversed.

Figure 3:
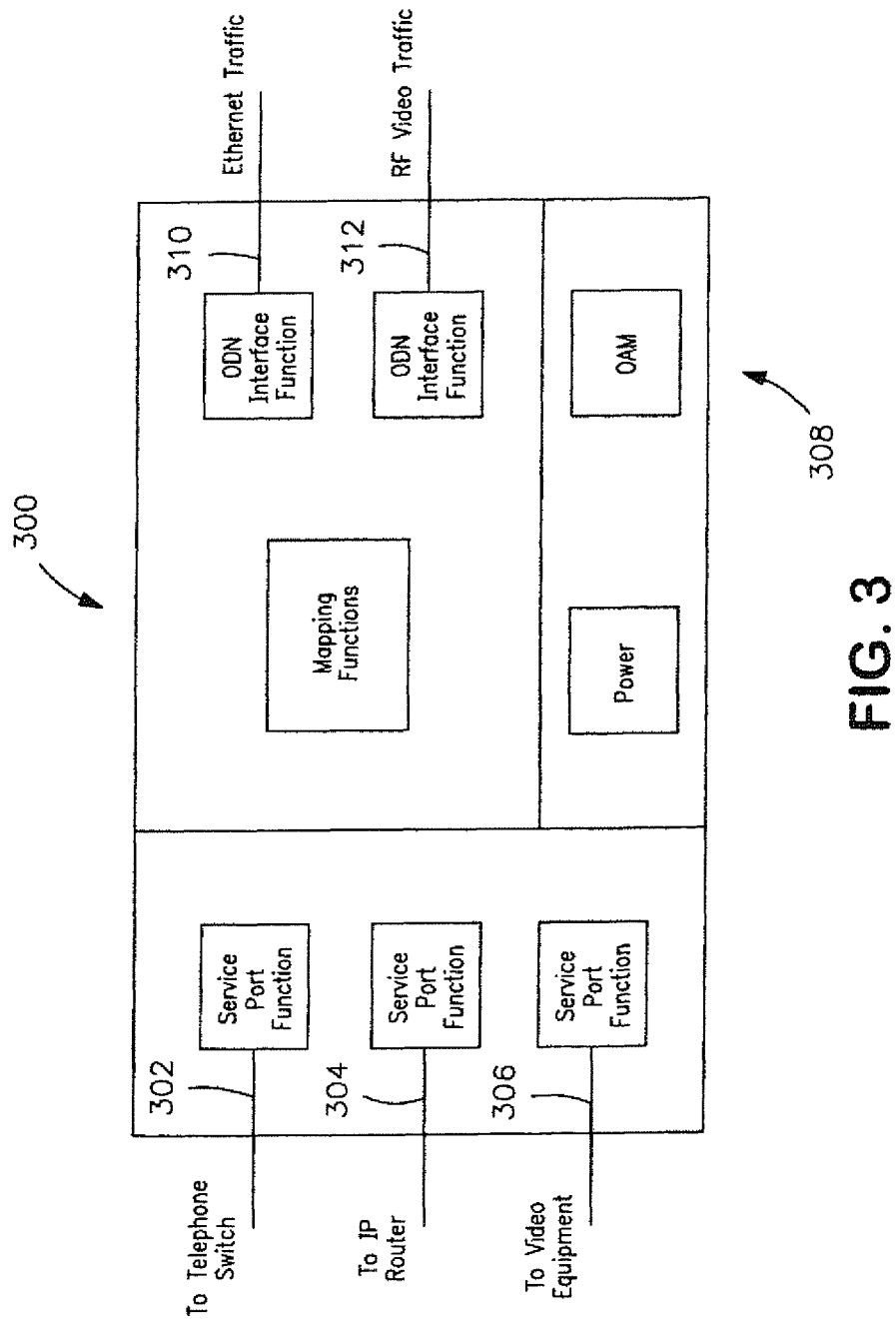
FIG. 3 is block diagram illustrating a first exemplary embodiment of an OLT functional architecture according to the present invention.

The optical line terminal (OLT) 300 in the optical network 200 is typically connected to the switched networks via standardized interfaces. At the distribution side, it presents optical accesses according to the agreed requirements, in terms of bit rate, power budget, etc. FIG. 3 shows an exemplary OLT architecture according to the present invention. In this configuration, the OLT 300 is connected to a telephony switch using an industry standard interface 302. In addition, the OLT is connected via a corresponding interface 304 to an IP router for data delivery. Finally, the OLT is connected via an interface 306 to video content suppliers to provide IP streaming video or RF video services. At the distribution side 308, the OLT 300 has two interfaces. The first interface 310 is for downstream and upstream Ethernet traffic, and the second interface 312 is for downstream video traffic only. At the first interface 310, Ethernet traffic is broadcast by the OLT 300 through the first 2×N star coupler (not shown) and extracted by the appropriate destination ONU based on the MAC address. The upstream traffic from various ONUs is received by the OLT 300 at the same interface 310. Due to the broadcasting nature in the downstream direction and the contention-based media access control in the upstream direction (described in greater detail subsequently herein), the Ethernet interface 310 at the OLT 300 operates in full-duplex mode (no CSMA/CD). Finally, video traffic is broadcast by the OLT through the second interface 312 and associated 2×N star coupler to the ONUs that are connected to customer's analog and/or digital TV receiving devices such as set-top boxes, etc. In addition to the above, the OLT 300 is also responsible for providing connections (or mapping) between the service port function (such as an IP router interface) and the ODN interface (such as the Ethernet interface to the PON). Techniques for providing such mapping are well known to those of skill in the art, and accordingly are not discussed in detail herein.

Figure 4:
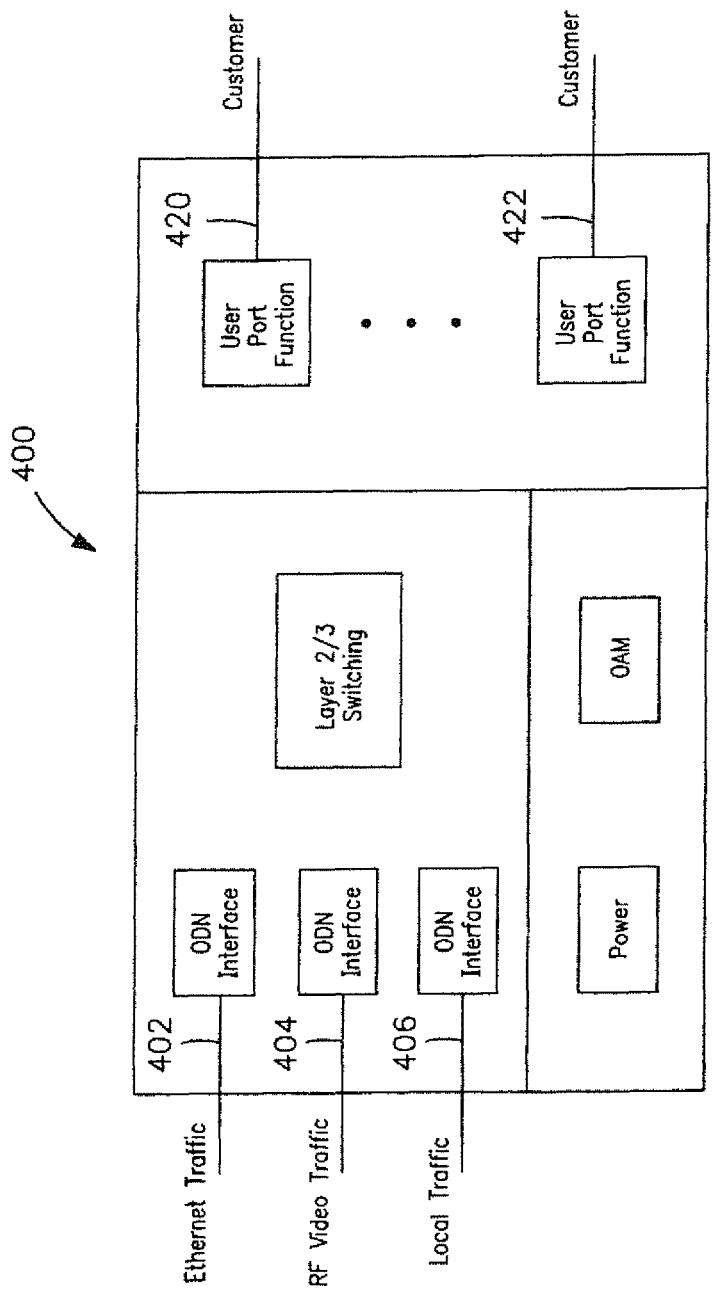
FIG. 4 is block diagram illustrating a first exemplary embodiment of an ONU functional architecture according to the present invention.

Referring now to FIG. 4, the exemplary ONU architecture of the invention is described in detail. The ONU 400 provides the interface between the customer and the PON. The primary function of ONU is to receive traffic in optical format and convert it to the customer's desired format. An ONU is also responsible for transmitting upstream customer traffic to the OLT 300. The ONU 400 has three optical distribution network interfaces 402, 404, 406. Through the first interface 402, the ONU connects to an input port of the aforementioned first (star) coupler and is responsible for receiving downstream Ethernet traffic from the OLT as well as transmitting upstream Ethernet traffic to the OLT 300 (EPON). For this interface 402, 1550 nm and 1310 nm wavelengths are used in the downstream and upstream directions, respectively, although it will be recognized that other wavelengths may be used for either or both downstream and upstream directions if desired consistent with the present invention. Note that the upstream Ethernet traffic of the illustrated embodiment carries data and voice as well as other signals such as video-on-demand and channel change requests. The OLT 300 acts as the coordinator between the Ethernet and video portions of the network (i.e., EPON and VPON, respectively, described subsequently herein). Through the second interface 404, the ONU 400 connects to an input port of the second star coupler and is responsible for receiving downstream video traffic from the OLT 300 (VPON). A 1550 nm wavelength is used in the present embodiment in the downstream direction for this interface. The third interface 406 of the ONU 400 provides the return path for upstream Ethernet traffic such that the CSMA/CD protocol can be implemented. In addition, it enables local networking services among the various ONUs. The operating wavelength for this interface is the same as that of the upstream traffic (1310 nm), albeit in the opposite direction. The downstream video traffic and the redirected upstream traffic (now traveling downstream) both pass through the second star coupler 204 and travel along the same distribution fiber. However, they operate at different wavelengths (1550 nm and 1310 nm, respectively). In addition to performing optoelectronic conversion, an ONU 400 also offers Layer 2 (or even Layer 3) switching capability, which allows customer traffic to be switched internally at the ONU 400. As in the case of ATM PON, an ONU may also include a number of other components (such as user port functions 420, 422) in addition to the ODN interface(s) 402, 404, 406. The implementation details of such other components are well known to those of ordinary skill, and accordingly not described further herein.

Figure 5:
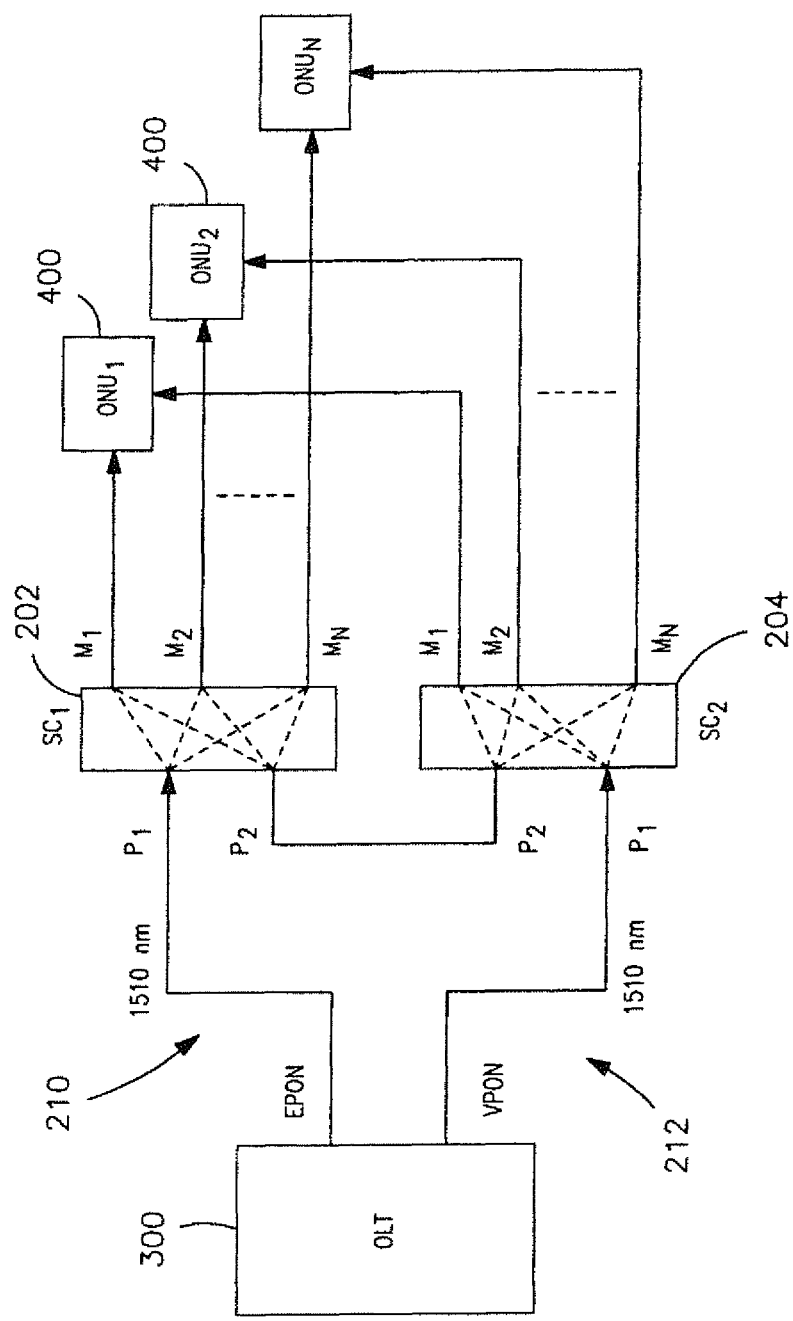
FIG. 5 is a functional block diagram of a first exemplary embodiment of the optical network architecture of the invention, illustrating downstream traffic flow.

FIG. 5 shows that in the downstream direction, the optical signals are broadcast by two different transmitters at the OLT 300 (e.g., located at the CO) to all the ONUs 400 by the first and the second couplers 202, 204 that are located within the first and second PONs 210, 212, respectively. As previously referenced herein, the difference between these two network portions 210, 212 in the present embodiment is that the first PON 210 carries data, voice, and IP streaming video (operating wavelength 1480-1580 nm), while the second PON 212 carries video (operating wavelength 1480-1580 nm). The first PON is an Ethernet passive optical network (EPON) where all data, voice, and IP video are encapsulated in Ethernet frames. The second PON 212 is a video passive optical network (VPON) where, inter alia, standard analog video content can be delivered along with digital CATV over the RF spectrum. As far as downstream traffic (from central office to user) is concerned, the architecture according to the embodiment of FIGS. 2-5 is effectively identical to a co-located EPON/VPON combination in which both networks have the same physical layout. It should be noted that the two feeder fibers can also be routed through diverse paths so that they do not get fiber cut at the same time.

In the upstream direction, instead of using a time-division multiple access (TDMA) technique as in the prior art, the present embodiment uses a contention-based media access control protocol CSMA/CD to manage the optical channel sharing among multiple ONUs 400. One of the four basic elements of Ethernet is the media access control (MAC) protocol; i.e., the carrier sense multiple access/collision detection (CSMA/CD) protocol. This protocol is designed to provide fair access to the shared channel so that all users are provided an opportunity to access the network and no user is locked out due to one or more other users "hogging" the channel. After every packet transmission, all users use the CSMA/CD protocol to determine which user gets access to the Ethernet channel next. It should be noted that CSMA/CD is only used in half-duplex mode of Ethernet operation. Half-duplex in the present context simply means that only one user can send upstream data over the Ethernet channel at any given time.

Figure 6:
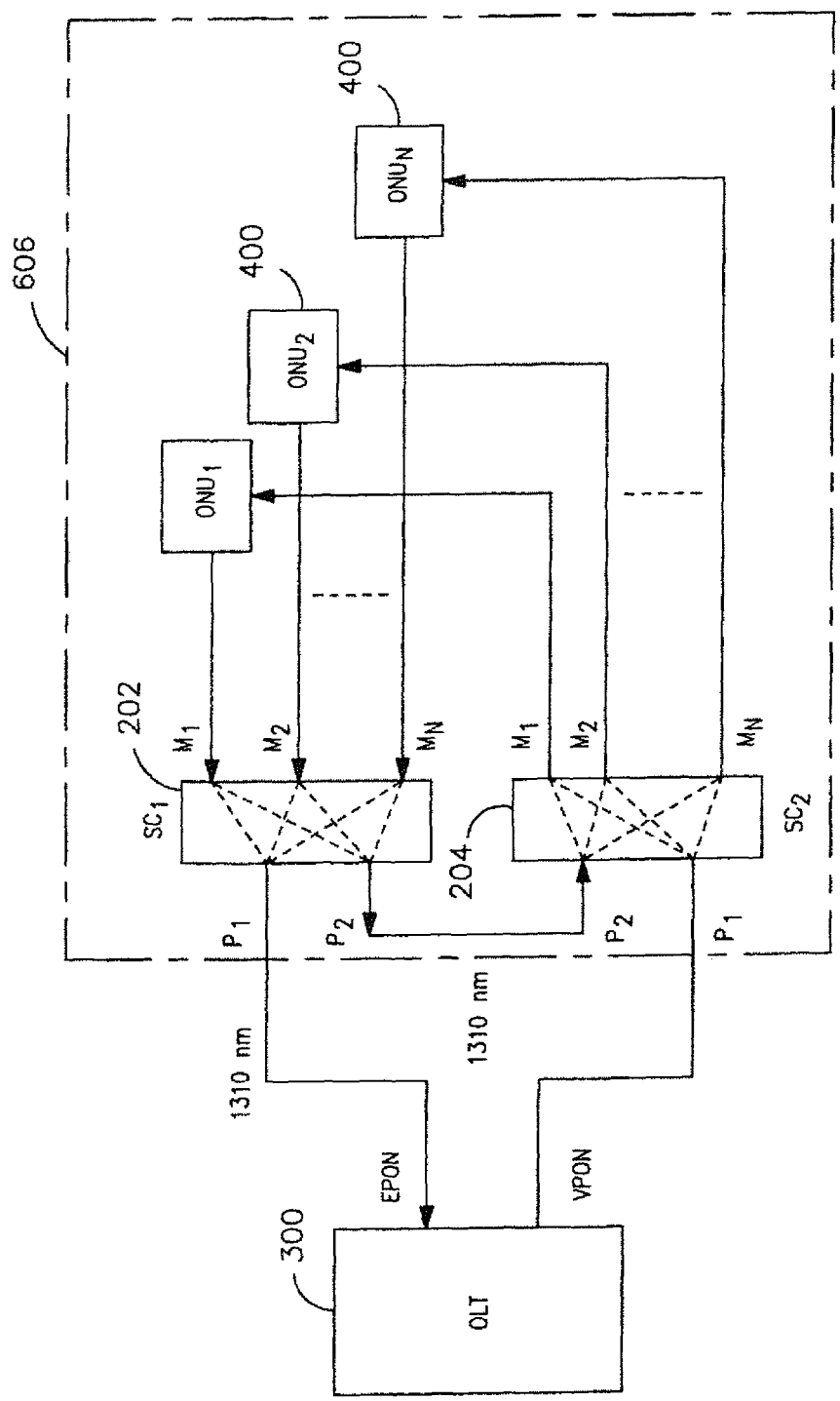
FIG. 6 is a functional block diagram of the optical network architecture of FIG. 5, illustrating upstream traffic flow.

As shown in FIG. 6, all of the ONUs 400 are in the same collision domain 606 and follow the same media access control rules. Being in the same collision domain means they are all part of the signal timing domain in which if two or more devices transmit at the same time, a collision will occur. The media access control rules refer to the CSMA/CD protocol. Note that the OLT 300 is not part of the collision domain in this embodiment, and therefore does not use CSMA/CD protocol even though it is directly connected (not through an Ethernet switching hub) to the rest of the network. The reason for not including OLT 300 in the collision domain of this embodiment is that the ONUs 400 can perform upstream bandwidth arbitration by utilizing CSMA/CD MAC entirely among themselves. Adding the OLT 300 to the collision domain has no additional value in this context. In fact, since OLT 300 is the only source for downstream traffic, there is no need for downstream bandwidth arbitration in the present embodiment. The OLT simply broadcasts to all the ONUs whenever it wants to.

From the above discussion, it is clear that while the architecture according to the present invention is generally similar to an Ethernet network, salient distinguishing features do exist. One such difference between an Ethernet architecture and that of the present embodiment is that CSMA/CD MAC of the present embodiment is only used in the upstream direction. In addition, the exact implementations (such as carrier detection) are different due to architectural differences between the two systems.

As in an Ethernet network, an ONU 400 must obey the following when transmission of data is desired: i) the ONU 400 must know when it can transmit; and ii) it must be able to detect and respond to a collision.

Figure 6A:
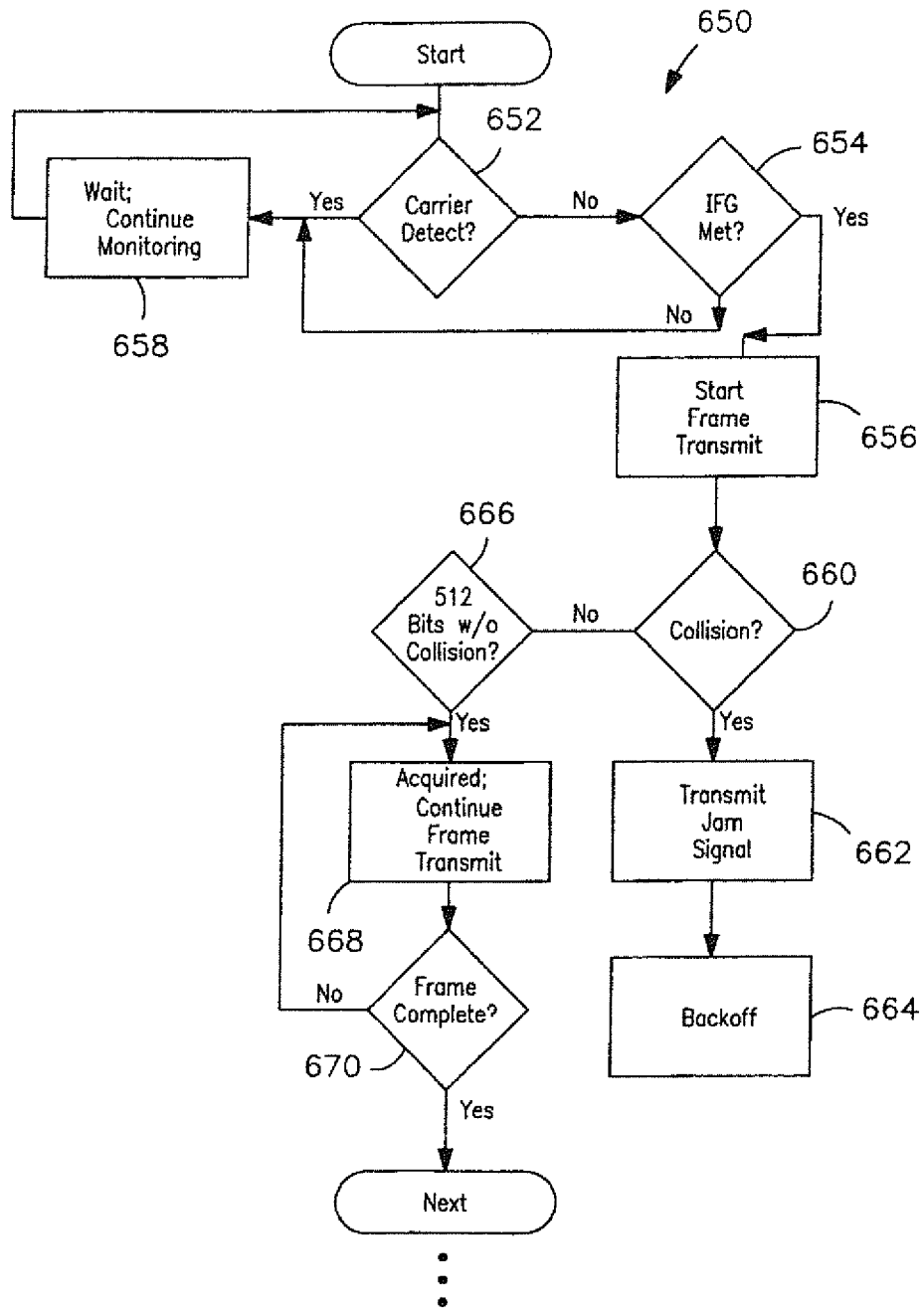
FIG. 6a is a logical flow diagram illustrating an exemplary method for determining when an ONU can transmit onto the network.

To determine when a given ONU 400 may transmit, the following methodology 650 is applied (referring to FIG. 6*a*).

If there is no carrier (step 652) and the period of no carrier has continued for an amount of time that equals or exceeds the inter-frame gap (IFG) per step 654, then the frame is transmitted immediately (step 656). Note that for an ONU, no carrier means that there is no optical signal received by its local receiver.

If there is carrier (i.e. there is optical signal) per step 652, the ONU 400 will continue to listen until the carrier becomes absent. As soon as the carrier becomes absent (step 658), the ONU may begin the process of transmitting a frame, which includes waiting for the inter-frame gap as previously described.

If a collision is detected during the transmission (step 660), the ONU will continue to transmit a collision enforcement jam signal (step 662). Note that for an ONU, a collision is signaled by a difference between the beginning of the received data and the data transmitted. The difference may be due to errors caused by colliding transmissions, or reception of an earlier transmission from another ONU, or a bit error on the channel. After sending the jam signal, the ONU goes through the backoff process (step 664). The operation and implementation of the backoff algorithm are well known to those of ordinary skill, and accordingly not described further herein.

Once an ONU 400 has transmitted a predetermined quantity of data (e.g., 512 bits of a frame for 100 Mbps assumed) without a collision (step 666), the ONU is considered to have acquired the channel (step 668). After channel acquisition, the ONU simply continues the transmission until the entire frame is transmitted (step 670).

It should be noted that although analogs of the above methodology have generally been used in Ethernet networks for many years, the present invention advantageously adapts this methodology to conventional passive optical networks, and specifically the architectures disclosed herein, for the first time.

In terms of required bandwidth, Fast Ethernet (100 Mbps) provides adequate bandwidth for contemplated applications occurring in the immediate future. Gigabit Ethernet (1000 Mbps, or 1 Gbps) and even more capable technologies developed subsequently hereto may be optionally utilized in applications where additional bandwidth is required. Hence, the present invention can advantageously be readily adapted to (i) the bandwidth needs of the particular application; and (ii) accommodate new higher data rate technologies, without altering the fundamental architecture disclosed herein.

Ethernet standards provide configuration guidelines to ensure that the important Ethernet timing requirements are met, so that the MAC protocol will function correctly. One of the requirements for Fast Ethernet configuration is that fiber segments must be less than or equal to 412 meters in length. Similarly, for Gigabit Ethernet, segment lengths are limited to 316 meters in order to meet the bit-timing budget of the system. These rules are implemented when configuring the ONU(s) 400, in addition to other signal transmission considerations. That is, in the exemplary application of the invention employing Fast Ethernet, the distance between one ONU 400 to another should be less than 412 m, and similarly in Gigabit applications, the ONU-ONU distance should be maintained less than 316 m.

ITU Std. G.983.1 requires that the maximum range (i.e., distances between each ONU and the OLT) of the PON is at least 20 km. While this is certainly a relatively easy task for Fast Ethernet when operated in full-duplex mode (assuming single-mode fiber optic cable is employed), it is not necessarily as easy when Gigabit Ethernet is utilized, as the standard specifies that a full-duplex 1000BASE-LX segment can reach as far as 5000 meters (with single-mode fiber optic cable). Nevertheless, the IEEE 802.3ah Ethernet in the First Mile (EFM) Task Force is as of the present date defining a 10 km range with single single-mode fiber (SMF) as a standard for "Point to Point over Fiber", and this standard can be used as a reference for the present embodiment. In addition, vendors have developed "extended reach" versions of 1000BASE-LX single-mode interfaces that can send signals over distances of 70-100 km or more. Therefore, in practice, a 20 km maximum range is not problematic for the EPON 210 operating at Gigabit Ethernet speed. It should be noted that although the EPON portion 210 of the system 200 according to the present invention does not operate in full-duplex mode in a precise manner, at least the OLT 300 operates in full-duplex mode. In addition, since OLT 300 is not part of the collision domain, the distances between each ONU 400 and the OLT do not have to be limited by the Ethernet timing requirements. As a result, distances allowed by full-duplex mode can be used between each ONU and the OLT.

An example downstream optical power budget calculation for the EPON 210 of the illustrated embodiment is shown in Table 1 below.

TABLE 1

| Items | Mean loss per unit (dB) | Quantity or length | Mean loss sub-total (dB) | Available power level (dBm) |
|---|---|---|---|---|
| Mean launched power | | | | −2.0 |
| Splitter insertion loss (1/16) | −14.5 | 1 | −14.5 | −16.5 |
| Splitter excess loss | −1.0 | 1 | −1.0 | −17.5 |
| Splitter uniformity | −3.0 | 1 | −3.0 | −20.5 |
| Splitter polarization dependent loss | −0.6 | 1 | −0.6 | −21.1 |
| Fiber optic cable at 1550 nm (dB/km) | −0.2 | 10 | −2.0 | −23.1 |
| Miscellaneous splices | −2.0 | 1 | −2.0 | −25.1 |
| Total optical loss | | | −23.1 | |
| Optical power level at the receiver | | | | −25.1 |
| Minimum receiver sensitivity (dBm) | | | | −30.00 |

An example upstream optical power budget calculation for the EPON 210 is shown in Table 2 below.

TABLE 2

| Items | Mean loss per unit (dB) | Quantity or length | Mean loss sub-total (dB) | Available power level (dBm) |
|---|---|---|---|---|
| Mean launched power | | | | −2.0 |
| Splitter insertion loss (1/2) | −3.6 | 1 | −3.6 | −5.6 |
| Splitter excess loss | −0.15 | 1 | −0.15 | −5.75 |
| Splitter uniformity | −0.8 | 1 | −0.8 | −6.55 |
| Splitter polarization dependent loss | −0.12 | 1 | −0.12 | −6.67 |
| Fiber optic cable at 1310 nm (dB/km) | −0.35 | 10 | −3.5 | −10.17 |
| Miscellaneous splices | −2.0 | 1 | −2.0 | −12.17 |
| Total optical loss | | | −10.17 | |
| Optical power level at the receiver | | | | −12.17 |
| Minimum receiver sensitivity (dBm) | | | | −30.00 |

Note that in the example of Table 2, a splitting ratio of 50/50 is used. A different splitting ratio (e.g. 25/75) can be used such that a different portion of optical power goes to the OLT.

An example optical power budget calculation for the return path of the system 200 is shown in Table 3 below.

TABLE 3

| Items | Mean loss per unit (dB) | Quantity or length | Mean loss sub-total (dB) | Available power level (dBm) |
|---|---|---|---|---|
| Mean launched power | | | | −2.0 |
| $1^{st}$ splitter insertion loss (1/2) | −3.6 | 1 | −3.6 | −5.6 |
| $1^{st}$ splitter excess loss | −0.15 | 1 | −0.15 | −5.75 |
| $1^{st}$ splitter uniformity | −0.8 | 1 | −0.8 | −6.55 |
| $1^{st}$ splitter polarization dependent loss | −0.12 | 1 | −0.12 | −6.67 |
| $2^{nd}$ splitter insertion loss (1/16) | −14.5 | 1 | −14.5 | −21.17 |
| $2^{nd}$ splitter excess loss | −1.0 | 1 | −1.0 | −22.17 |
| $2^{nd}$ splitter uniformity | −3.0 | 1 | −3.0 | −25.17 |
| $2^{nd}$ splitter polarization dependent loss | −0.6 | 1 | −0.6 | −25.77 |
| Fiber optic cable at 1310 nm (dB/km) | −0.35 | 2 | −0.7 | −26.47 |
| Miscellaneous splices | −2.0 | 1 | −2.0 | −28.47 |
| Total optical loss | | | −26.47 | |
| Optical power level at the receiver | | | | −28.47 |
| Minimum receiver sensitivity (dBm) | | | | −30.00 |

FIGS. 7a-7b illustrate an exemplary methodology for power balancing according to the invention. As previously described, the near-far problem is caused by unequal distances between the central office (CO) and various ONUs. The longer the distance, the lower the power level received at the OLT 300. To overcome this problem, the power levels from all the ONUs 400 shall be equalized to a pre-defined value at the input ports of the first star coupler. To achieve this goal, the ONU power level differences due to varying distances as seen by the first coupler 202 need to be compensated.

The power balancing methodology according to the present embodiment first performs a calibration process 700 (FIG. 7a) to establish an accessible resource (e.g., look-up table) per step 704 that contains at least three types of information: (a) the ONU-to-coupler distance, (b) the ONU transmitter power level, and (c) the expected received power from the return path. In the exemplary look-up table, this information may comprise respective columns or rows. The resource is designed to ensure that for a given distance, there is a corresponding transmitter power level that will lead to equalized power levels from all the ONUs 400 at the input ports of the first (star) coupler. The resource information is stored in an appropriate storage device (not shown) per step 706 of FIG. 7a.

When a new ONU 400 is powered on, as part of its initialization routine, it sends a message (i.e., "self-ranging" message) to itself per step 732 of FIG. 7b through the signal return path and measures the round trip time which directly relates to the distance between the ONU 400 and the coupler(s) 202, 204.

Once the distance between the ONU 400 and the star coupler 202, 204 is known, the resource of FIG. 7a is accessed (step 734) to determine the appropriate transmitter power level, and the ONU transmitter power level adjusted accordingly per step 736.

Next, per step 738, the power received from the return path is measured and compared with the expected value. If these values match (within a determined error band), the ONU transmitter power level is considered balanced, and the ONU enters the operational state (step 740). If the values do not match in step 738 due to reasons other than interferences from other ONUs, the ONU transmitter power is re-adjusted in the appropriate direction (as determined by the sign of the difference of the comparison of step 738) for one or more additional times. If the compared values still do not match after such re-adjustment(s), the ONU remains in the non-operational state and the failure is logged, reported, and/or other corrective action instituted.

Figure 8:
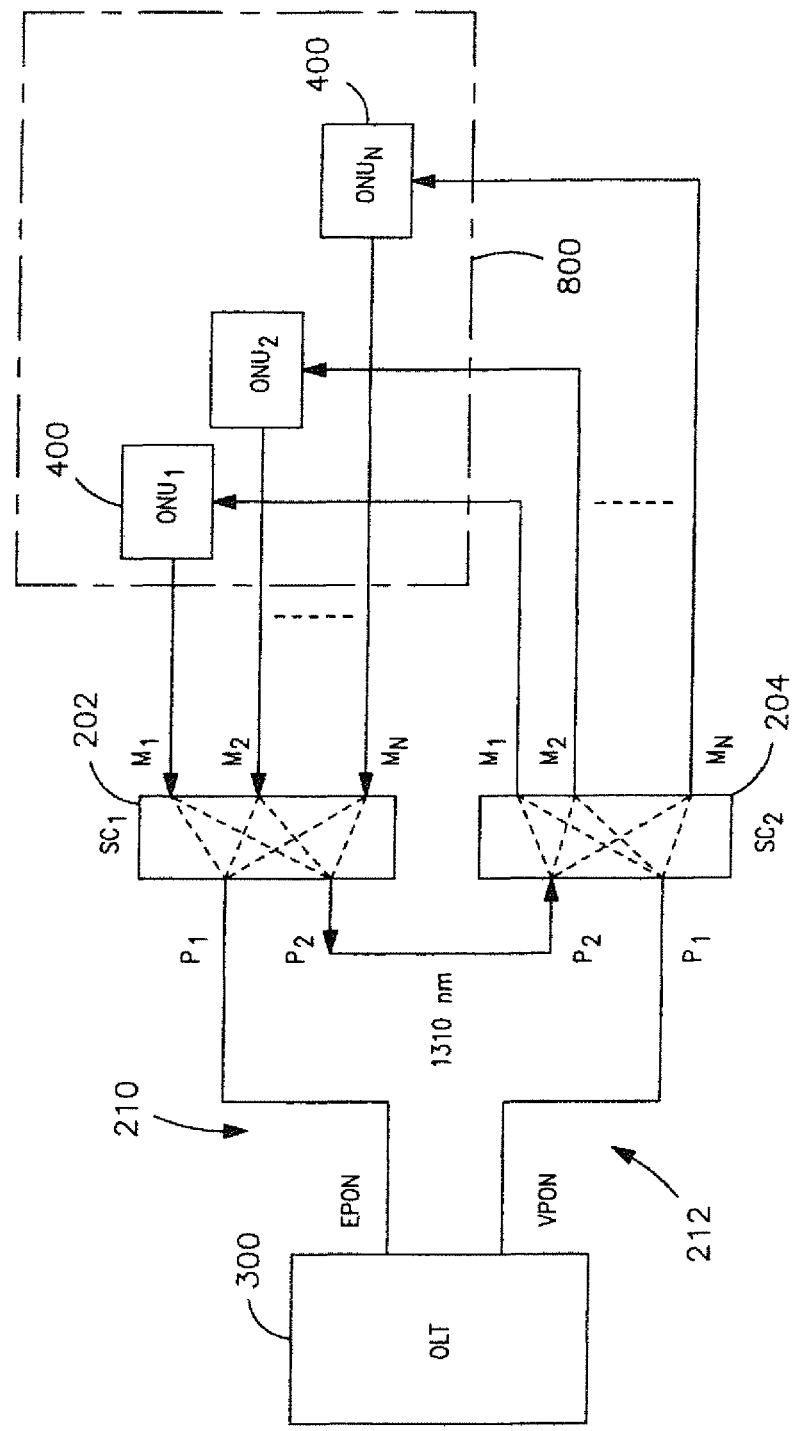
FIG. 8 is a functional block diagram of the optical network architecture of FIG. 5, illustrating the operation of local networking services according to the present invention.

FIG. 8 illustrates that the architecture according to the present embodiment can be easily extended to provide "local" networking services. As used herein, local network services includes, for example, so-called local area networks (LAN), intranets, secure ("trusted") networks, and virtual private networks (VPN). Such networking services may be desirable, for example, in scenarios where the use of intranet is essential, such as in business offices or other enterprises, community networking, and premises networking cases. The operation of the local network 800 of the embodiment of FIG. 8 is similar to an Ethernet LAN. When one ONU 400 needs to communicate to another ONU, it follows the same CSMA/CD rules as described previously herein. However, the destination address of the receiving ONU is a local one. It should be noted that since the same transmitter is used for both upstream traffic and local traffic, the total upstream bandwidth can be shared between the upstream traffic and the local traffic if local networking service were selected.

Figure 9:
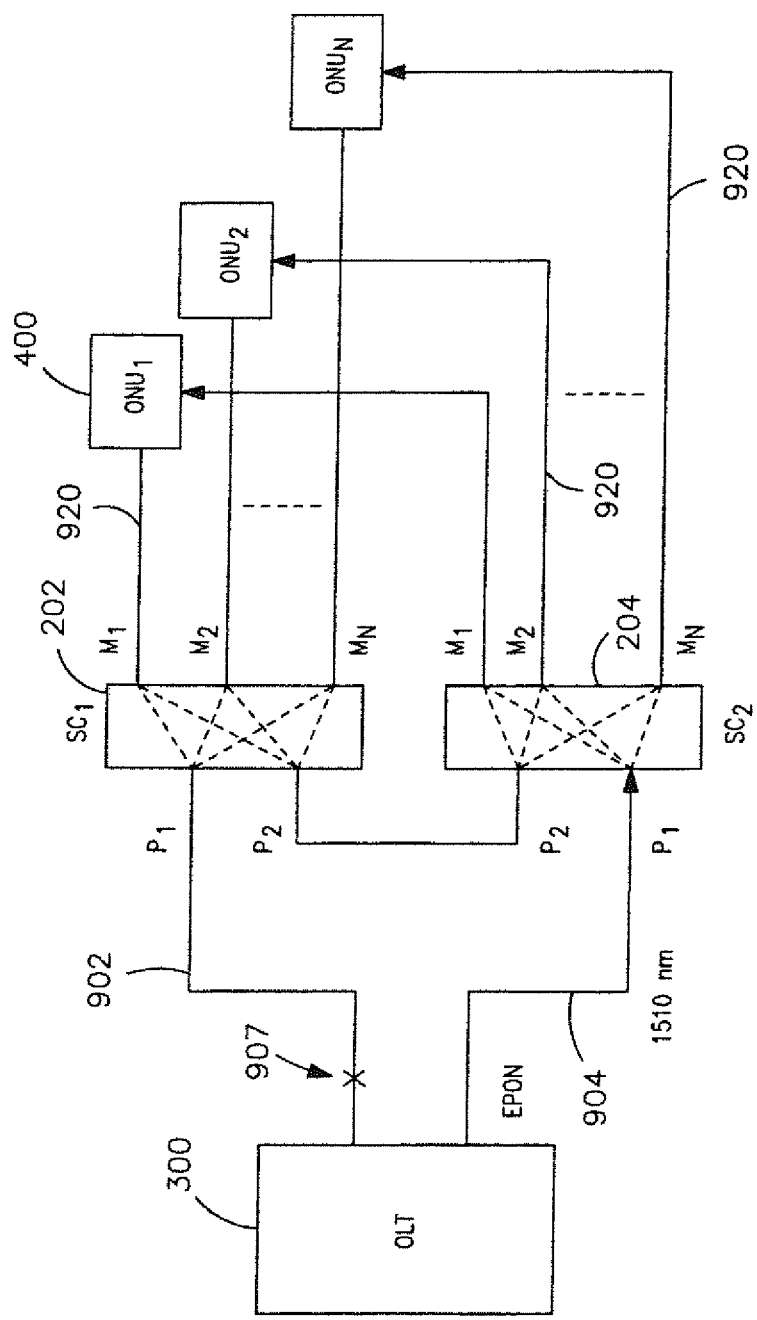
FIG. 9 is a functional block diagram of the optical network architecture of FIG. 5, illustrating an exemplary arrangement for a 1:1 protection switch (downstream traffic only) according to the present invention.
Figure 10:
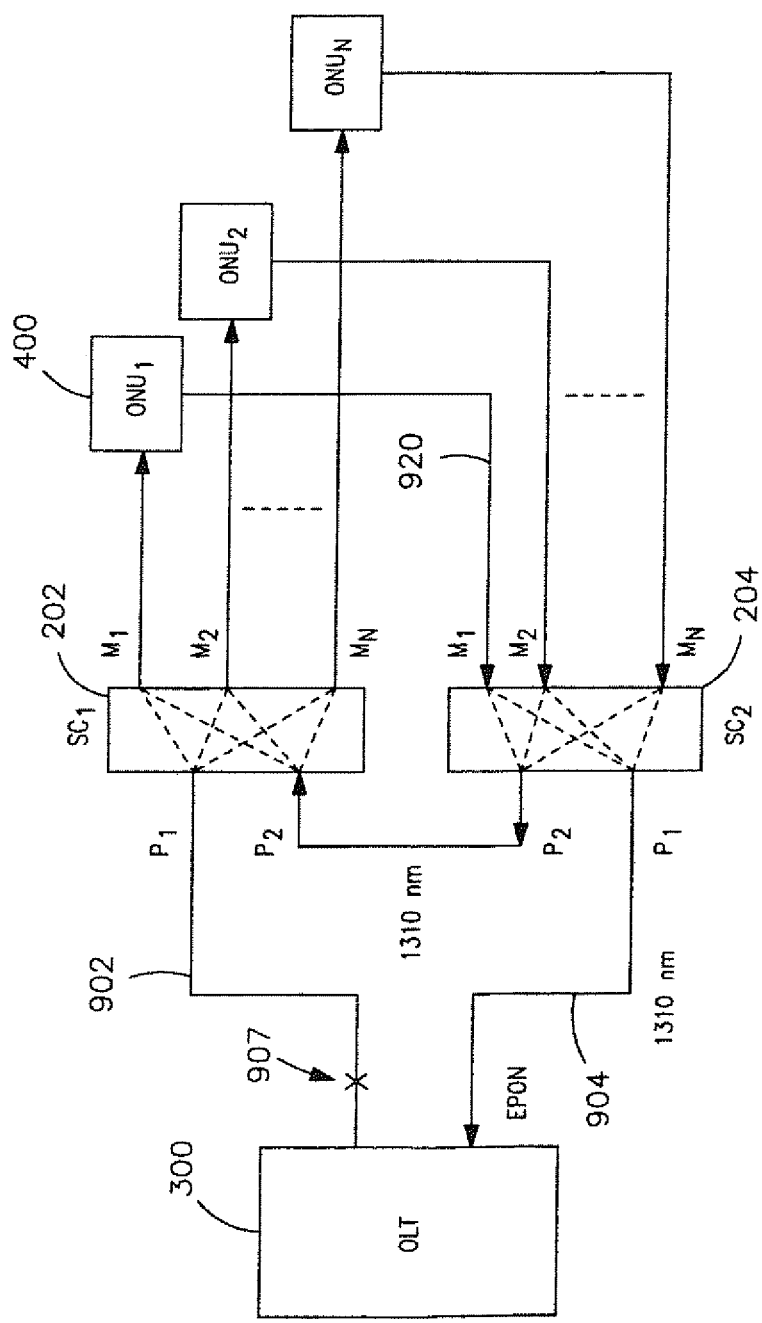
FIG. 10 is a functional block diagram of the protection switch arrangement of FIG. 9, except with upstream traffic.
Figure 11:
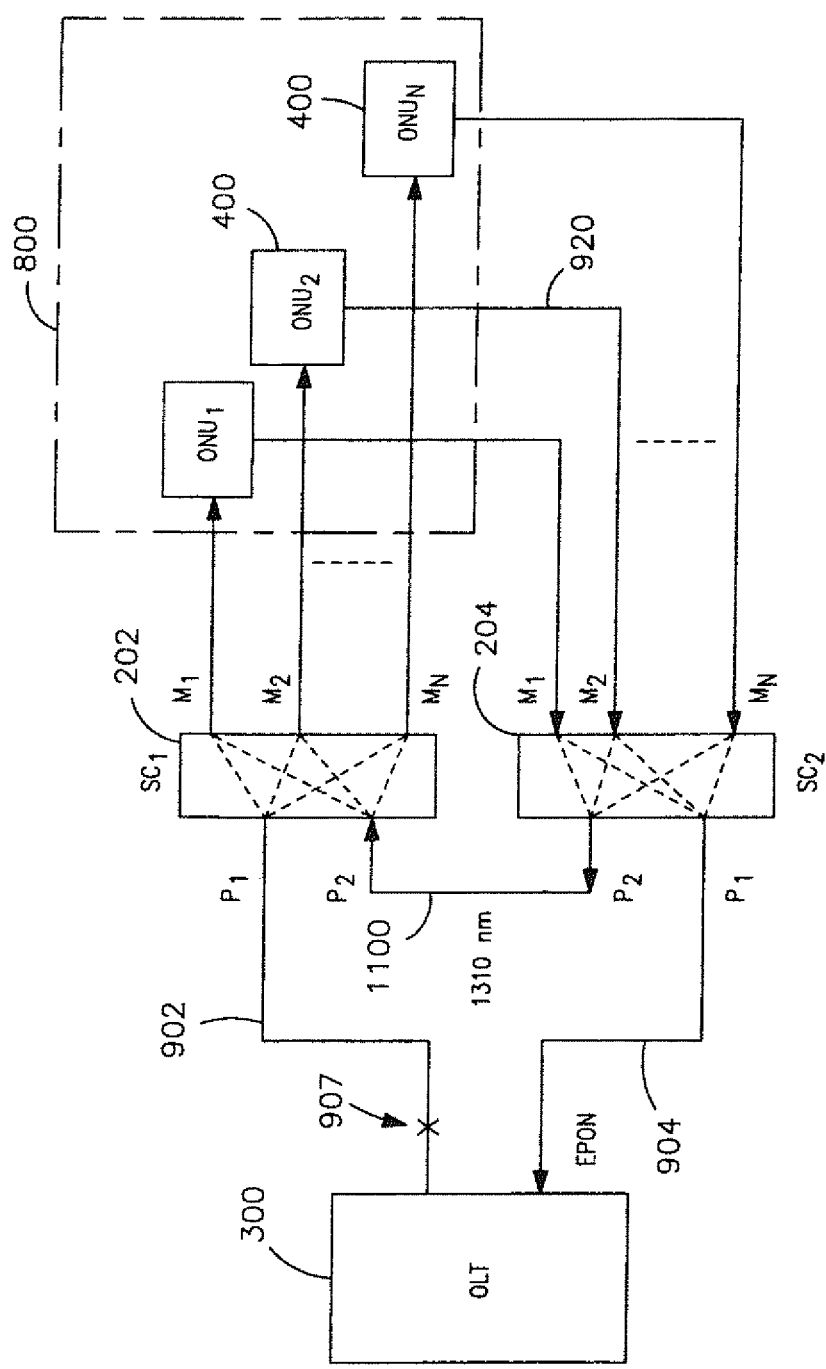
FIG. 11 is a functional block diagram of the protection switch arrangement of FIGS. 9 and 10, illustrating the operation of local networking in the case of a protection switch.

Referring now to FIGS. 9 and 10, the feeder-fiber protection aspects of the invention are described in detail. Specifically, as shown in FIGS. 9 and 10, the symmetric system architecture 200 of the present invention can be utilized to provide protection switching in case of feeder-fiber failure. As is well known in the fiber-optic communications arts, an unprotected feeder-fiber is a highly vulnerable part of a PON system. A fiber cut may cause loss of service to all users for significant amount of time (on the order of hours or even days). Therefore, it is highly desirable that any PON architecture have some redundancy strategy in place. The redundancy strategy according to the embodiment of FIG. 2 (as detailed in FIGS. 9 and 10) is based on 1:1 (one-to-one) protection, although it will be recognized that other schemes of protection may be employed. In 1:1 protection, two fibers are used between the source and the destination. Traffic is transmitted over only one fiber at a time (normally referred to as the working fiber). If the working fiber is cut, the source and destination both switch over to the remaining (i.e., protection) fiber. One of the main advantages of 1:1 over other techniques such as "1+1" protection is that under normal operation, the protection fiber can be used to transmit lower-priority traffic. This lower-priority service will be discontinued if the working fiber is cut.

As shown in FIG. 9 and FIG. 10, the first feeder-fiber 902 connecting the OLT 300 and the first coupler 202 is considered as the working fiber, and the second feeder-fiber 904 connecting the OLT 300 and the second coupler 204 is considered as the protection fiber. Under normal conditions, the system operates as previously described with respect to FIGS. 2-8. However, when a fiber-cut 907 occurs on the working fiber 902, the OLT 300 and the ONU(s) 400 will both detect the cut and switch to the protection fiber 904, and no automatic protection switching (APS) protocol is required. To enable the protection switch capability, a small number of devices need to be added to the existing architecture 200. Specifically, on the OLT side, a simple optical switch (not shown) can be utilized such that the signal can be switched from the working fiber 902 to the protection fiber 904. On the ONU side, the receiver originally considered (for receiving local traffic only) now need to be replaced by or modified with a transceiver that is the same type as those being used for the ONU-OLT communication. In order to operate under both normal and failure conditions, the two transceivers at the ONU 400 must be capable of receiving optical signals properly in both 1310 nm and 1550 nm wavelength ranges, respectively, which is readily accomplished using existing and well known optical technology.

Thus, a PON system that provides 1:1 feeder-fiber protection capability is created with very minimal modification and cost. In fact, if service and access network availability is the primary concern, this functionality can be implemented in the PON at manufacture/installation.

It should also be noted that in addition to feeder fiber failure, the distribution fiber(s) 920 could also fail. However, the impact of distribution fiber failure is much smaller, as such failures only affect the connected ONU, and therefore only a limited number of users as compared to the feeder fiber. There is a possibility that an ONU 400 will perform a fiber switch due to a distribution fiber failure (as opposed to the feeder failure previously described). In this case, switching over to the protection fiber will not restore the traffic, since the OLT 300 is still operating on the working fiber. To handle this situation, the ONU of the present embodiment is optionally configured to simply switch back to the working fiber, and at the same time, the OLT can declare that the affected ONU is out of service after a predetermined time period of lost communication with the ONU.

As far as local networking services during a feeder fiber failure are concerned, the ONUs 400 can still communicate with each other as if no protection switch has occurred. However, the signal path 1100 under this circumstance (FIG. 11) is different than that previously shown in FIG. 8.

It will be further recognized that while the foregoing discussion is cast in terms of a single PON 200 having an OLT 300, two couplers 202, 204, and a plurality of ONUs 400, the present invention may be adapted to larger or different architectures wherein, for example, multiple PONs 200 are interconnected, or additional OLTs and/or couplers are utilized.

It should be noted that although in the aforementioned description Ethernet CSMA/CD MAC was used to perform access arbitration in the upstream direction, other techniques (such as TDMA) can be used as well provided certain pluggable circuit pack units at both the OLT and the ONUs are replaced by appropriate units that support TDMA functionalities. In addition, a different set of software components may be required at both the OLT and the ONUs, such software being readily implemented by those of ordinary skill given the present disclosure.

Furthermore, it will be recognized that the architecture of the present invention advantageously provides economies in terms of component usage and configuration. Specifically, it is noted that under the prior art, two separate or "stand alone" optical networks (i.e., a VPON and EPON configured as separate networks) will require an effectively equivalent number of components to the improved "connected" architecture of the present invention. Hence, the present invention affords the aforementioned enhanced functionality (i.e., collision detection, protection switch, and local networking services) without requiring additional components of any significance.

Furthermore, the architecture of the present invention affords enhanced cost efficiency over the prior art, in that existing, lower cost "off-the-shelf" CSMA/CD and related components can be used as opposed to the more costly and often more complex components used for upstream arbitration in such prior art systems; e.g., a TDMA system requiring complex synchronization and related techniques.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing converged services, the method comprising:
   providing a first type of data transfers to a first input of a first optical coupler;
   providing a second type of data transfers to a second input of said first optical coupler;
   enabling a second optical coupler to redirect said first type of data transfers from said second optical coupler to said first input of said first optical coupler, thereby enabling said providing of said first type of data transfers to said first input of said first optical coupler; and
   enabling said first optical coupler to combine said first type of data transfers and said second type of data transfers into an output stream for delivery to a plurality of subscriber devices via a converged passive optical network (PON).

2. The method of claim 1, further comprising enabling provision of a bidirectional data stream, said bidirectional data stream comprising (i) an upstream data stream through said second optical coupler and (ii) a downstream data stream through said first optical coupler.

3. The method of claim 2, where said providing said second type of data transfers comprises providing unidirectional video traffic, said providing of said unidirectional video traffic comprising broadcasting at least video data to said plurality of subscriber devices.

4. The method of claim 2, where said upstream and downstream data streams comprise one or more Ethernet data frames, said one or more Ethernet data frames each comprising a medium access control (MAC) address.

5. The method of claim 4, where said broadcasting said at least video data comprises broadcasting at least video-on-demand content.

6. The method of claim 1, where said converged PON comprises (i) a video PON (VPON) associated with said first optical coupler and (ii) an Ethernet PON (EPON) associated with said second optical coupler.

7. The method of claim 6, where said second optical coupler of said converged PON is configured to independently deliver and receive said first type of data transfers to and from said plurality of subscriber devices based on a respective medium access control (MAC) address thereof.

8. An optical line terminal (OLT) communicable within an optical network, the OLT comprising:
   a first network interface configured to:
      transmit at least Ethernet traffic to one or more client devices via a first optical apparatus of the optical network; and
      enable the first optical apparatus to receive at least Ethernet traffic from the one or more client devices via the first optical apparatus; and
   a second network interface configured to enable transmission of at least video traffic and the at least received Ethernet traffic to the one or more client devices via a second optical apparatus of the optical network, the second optical apparatus being in data communication with the first optical apparatus.

9. The OLT of claim 8, wherein the first network interface is further configured to cause the first optical apparatus to redirect the at least received Ethernet traffic to the second optical apparatus.

10. The OLT of claim 8, wherein:
    the first network interface is further configured to transmit the at least Ethernet traffic and receive the at least Ethernet traffic at different wavelengths;
    at least some optical signals associated with the transmission of the at least Ethernet traffic comprise a wavelength of 1550 nanometers; and
    at least some optical signals associated with the receipt of the at least Ethernet traffic comprise a wavelength of 1310 nanometers.

11. The OLT of claim 8, further comprising:
    a first upstream interface in data communication with a telephony switch;
    a second upstream interface in data communication with an Internet Protocol (IP) router for the Ethernet traffic; and
    a third upstream interface in data communication with a source for the video traffic;
    wherein the first, second, and third upstream interfaces are distinct data interfaces from the first and second network interfaces.

12. The OLT of claim 8, wherein:
    the first optical apparatus comprises a first 2×N star coupler communicable with the one or more client devices;
    the second optical apparatus comprises a second 2×N star coupler communicable with the one or more client devices; and
    the first and second 2×N star couplers are disposed between the OLT and the one or more client devices.

13. The OLT of claim 8, wherein:
    the first optical apparatus is disposed within a first passive optical network (PON), the first PON comprising an Ethernet PON (EPON);
    the second optical apparatus disposed within a second PON, the second PON comprising a video PON (VPON); and
    the second optical apparatus is configured to (i) combine video traffic transmitted in the VPON with Ethernet traffic received from the EPON, and (ii) transmit the combination to the one or more client devices.

14. The OLT of claim 8, wherein the OLT is configured to, responsive to detection of failure of a fiber corresponding to the first network interface, automatically switch to the second network interface to transmit the Ethernet traffic to the one or more client devices.

15. Optical network apparatus, comprising:
a first P×N optical coupler configured for use with at least one passive optical network (PON), the first P×N optical coupler comprising:
- at least a first interface coupled to an optical line terminal (OLT) configured to at least receive video data signal from the OLT;
- a plurality of second interfaces configured for communication with a plurality of optical network units (ONUs); and
- at least a third interface configured for communication with a second P×N optical coupler;

wherein said first P×N optical coupler is further configured to provide said video data signal to at least one of said plurality of ONUs via at least one of said plurality of second interfaces; and wherein said OLT is configured to (i) interface with said second P×N optical coupler via said at least one PON, and (ii) cause said second P×N optical coupler to redirect at least a portion of data services to the first P×N optical coupler via said at least third interface.

16. The optical network apparatus of claim 15, wherein said first P×N optical coupler comprises a 2×2 directional coupler.

17. The optical network apparatus of claim 15, wherein said video data signal comprises a plurality of video content that are received and broadcast to said plurality of ONUs via a range of operating wavelengths.

18. The optical network apparatus of claim 17, wherein said plurality of video content comprise data encapsulated in Ethernet frames, the Ethernet data obtained at least in part from said second P×N optical coupler via at least said third interface.

19. The optical network apparatus of claim 15, wherein said OLT is configured to transmit said video data signal to said first P×N optical coupler via said at least first interface.

* * * * *